United States Patent [19]
Iida

[11] 4,113,823
[45] Sep. 12, 1978

[54] METHOD OF MANUFACTURING PRESTRESSED CONCRETE PIPE

[75] Inventor: Hideo Iida, Sagamihara, Japan

[73] Assignee: Nippon Hume Pipe Company Limited, Tokyo, Japan

[21] Appl. No.: 715,493

[22] Filed: Aug. 18, 1976

Related U.S. Application Data

[60] Division of Ser. No. 463,764, Apr. 24, 1974, Pat. No. 3,982,565, which is a continuation-in-part of Ser. No. 393,188, Aug. 30, 1973, abandoned, which is a continuation of Ser. No. 174,787, Aug. 24, 1971, abandoned.

[51] Int. Cl.² ............... B28B 23/10; B28B 23/12; F16L 9/08
[52] U.S. Cl. ................... 264/228; 138/176; 264/256; 264/311
[58] Field of Search ............ 264/228, 311, 256; 138/176

[56] References Cited

U.S. PATENT DOCUMENTS

| | | | |
|---|---|---|---|
| 3,467,144 | 9/1969 | Rice | 138/176 |
| 3,654,968 | 4/1972 | Mizuma | 138/176 |

Primary Examiner—Thomas P. Pavelko
Attorney, Agent, or Firm—Toren, McGeady and Stanger

[57] ABSTRACT

A method of manufacturing prestressed concrete pipe which comprises arranging a reinforcing cage in a form, casting expansive concrete within the form in such a manner that the reinforcing cage is disposed outwardly of the center of the wall thickness of the concrete layer, and then forming the pipe centrifugally.

2 Claims, 16 Drawing Figures

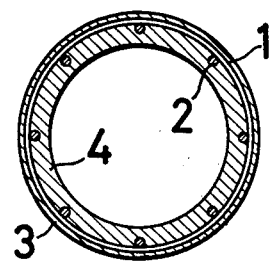
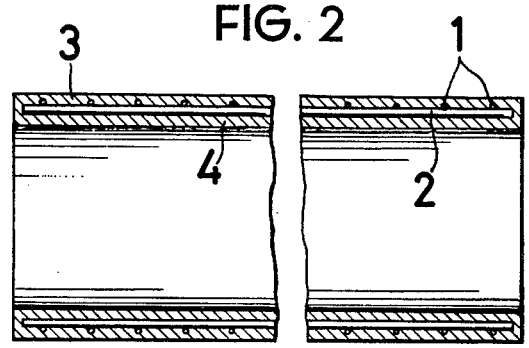
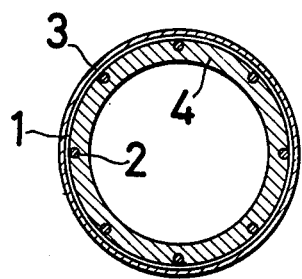
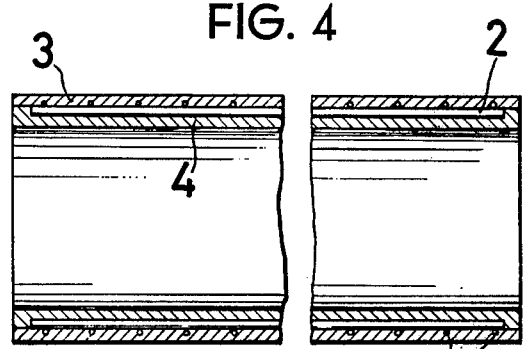
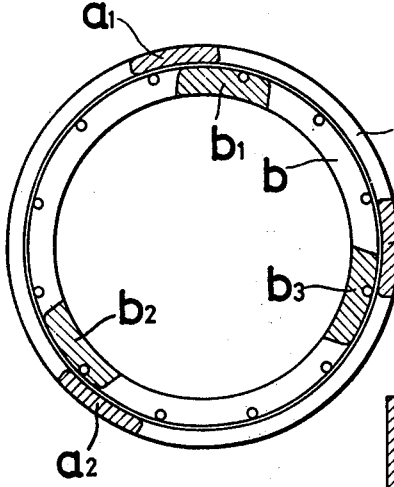
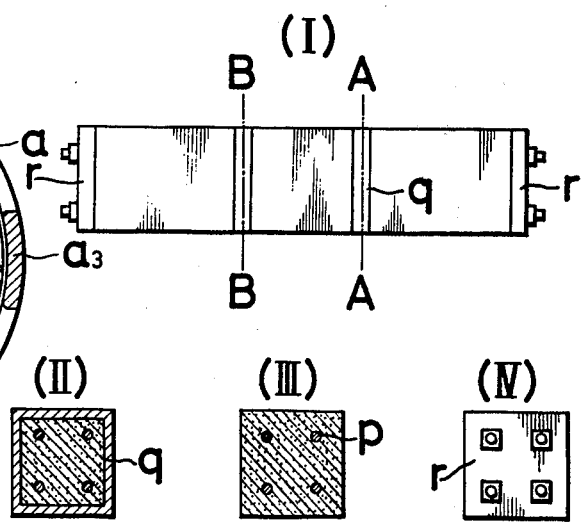

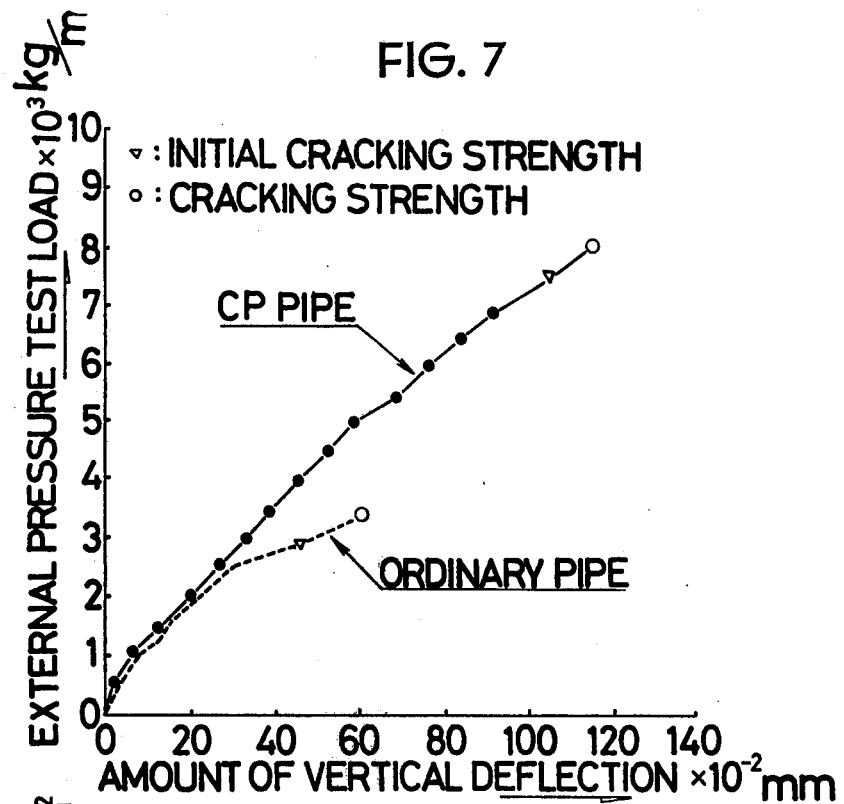
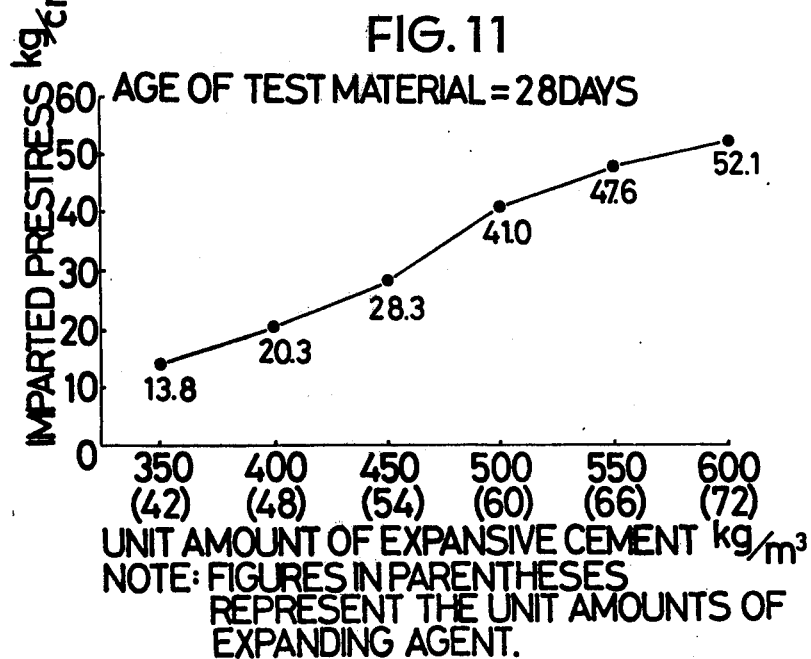

☆: EXT.-PRESS. STR. AT INIT. CRACKING.
★: EXT.-PRESS. STR. AT RE-CRACKING.
⬨: EXT.-PRESS. STR. AGAINST CRACK WIDTH INCREASE TO 0.25mm.

METHOD OF MANUFACTURING PRESTRESSED CONCRETE PIPE

This is a division of application Ser. No. 463,764 filed Apr. 24, 1974 now U.S. Pat. No. 3,982,565, which was a continuation-in-part of application Ser. No. 393,188 filed Aug. 30, 1973, now abandoned, which, in turn, was a continuation of application of Ser. No. 174,787 filed Aug. 24, 1971 now abandoned.

This invention relates to manufacture of improved prestressed concrete pipe, and more specifically to manufacture of improved prestressed concrete pipe by centrifugal technique.

Heretofore, the fabrication of prestressed concrete pipe has required special equipment to place the reinforcement under tension and has demanded more labor than does the manufacture of conventional reinforced concrete pipe.

The present invention has for its object to provide methods of manufacturing prestressed concrete pipe without the need of any such equipment and extra labor.

Thus the invention provides a method of forming prestressed concrete pipe which comprises arranging a reinforcing cage in a form, placing expensive concrete into the form in such a manner that the cage is disposed outwardly of the center of thickness of the concrete layer, and then forming the concrete pipe centrifugally.

The invention also provides a method of forming prestressed Hume pipe which comprises first placing ordinary concrete into a rotating form which is held on its side, forming an ordinary concrete layer approximately up to the outer periphery of the reinforcing cage in the wall of the pipe, and then placing expansive concrete thereover to form a pipe centrifugally to a predetermined wall thickness.

Further, the invention provides a method of forming prestressed Hume pipe with a new arrangement of reinforcement therein.

The methods of the invention will be described in more detail below with reference to the accompanying drawings, in which:

FIG. 1 is a cross sectional view of a prestressed concrete pipe formed in accordance with one of the methods of the invention;

FIG. 2 is a longitudinal sectional view of the pipe;

FIG. 3 is a cross sectional view of a prestressed concrete pipe formed in accordance with another method of the invention;

FIG. 4 is a longitudinal sectional view of the pipe;

FIGS. 7 and 8 are graphs illustrating the procedure of Test Example III and the results;

FIG. 9 is a cross sectional view illustrating the points where specimens for Test Example IV were taken;

Figure 12:
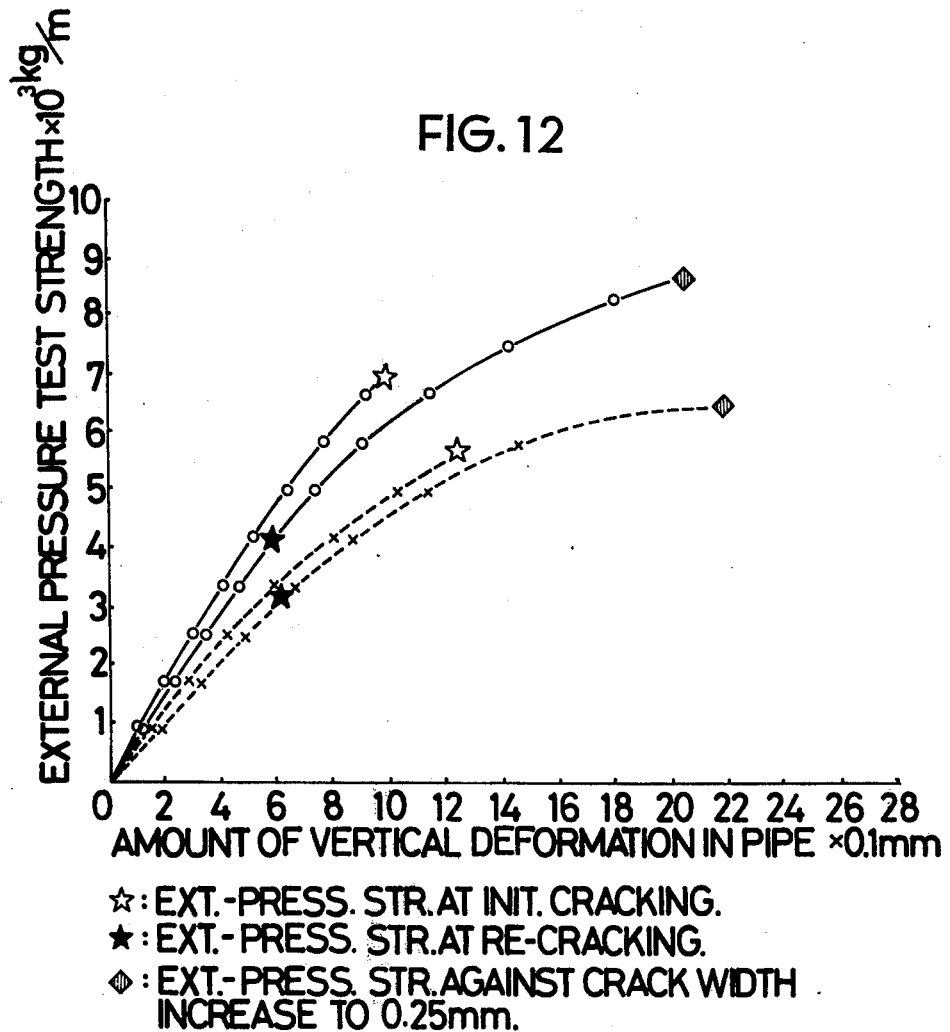
Figure 15:
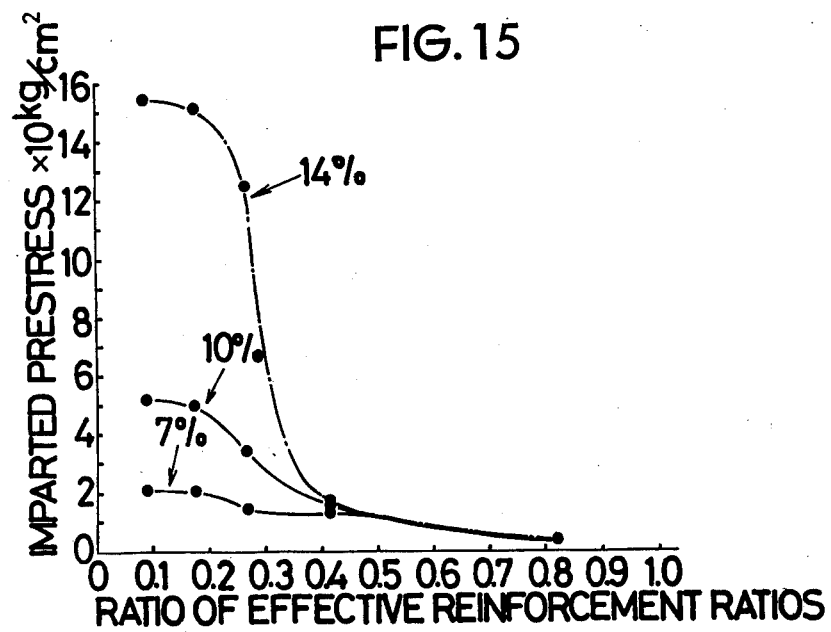

FIGS. 10(I) to (IV) are views of specimens for Test Example V;

FIG. 11 is a graph illustrating the results of Test Example V;

FIG. 12 is a graph illustrating the results of Test Example VI;

FIGS. 13(I) to (III) are views explanatory of a hypothesis herein used to provide a basis for the calculation of effective reinforcement ratios;

FIGS. 14(I) and (II) are a cross sectional view and a graph, respectively, illustrating the procedure and results of Test Example VII;

FIG. 15 is a graph illustrating the results of Test Example VIII; and

FIGS. 16(I) and (II) are views of a uniaxially restrained specimen.

Throughout these figures, reference numeral 1 indicates a circumferentially wrapped reinforcement, and numeral 2 indicates longitudinal reinforcing members for a concrete pipe. A reinforcing cage is formed of these reinforcing members. Numeral 3 indicates an outer concrete layer and 4, an inner concrete layer.

First, the reinforcing cage 1-2 is placed in a form (not shown) in the usual manner. This reinforcing cage 1-2 may be formed by netting ordinary iron wires, hard steel wires or piano wires, whichever desired. The iron wires may be used in the form of flat wires having at least one flat side, with the flat side directed inwardly. The reinforcing cage should have an outside diameter smaller than the inside diameter of the form, desirably with as little gap between the cage and the inner wall of the form as possible.

In practicing the method shown in FIGS. 1 and 2, expansive concrete is cast in the form immediately after the placement of the reinforcing cage. The concrete may be placed by any known matter. The expansive concrete to be cast is a concrete having a tendency to expand with the setting of the cement. An expansive concrete having an expansion rate of 0.1 to 0.5 percent is suitable for this purpose.

The expanding agent to be mixed in the expansive concrete is calcium sulfoaluminate, for example having a ternary structure of 55-67% CaO, 4-10% $Al_2O_3$, and 29-40% $SO_3$, all by weight.

Next, the form is rotated and centrifugal compaction is effected in the usual manner. When compacted in this way, the pipe shows a distribution of the expanding agent such that more of the agent is concentrated in the inner layer 4 than in the outer layer 3. This is because the aggregate is moved toward the outer layer 3, while the cement paste containing the expanding agent is urged toward the inner layer 4, owing to the difference in specific gravity.

After the compaction, the concrete expands as the cement sets. The free expansion is hindered by the reinforcing cage, and the reinforcement is subjected to a tension corresponding to the expansion, with the result that a resistance to tensile stress is induced in the pipe wall.

According to the method illustrated in FIGS. 3 and 4, plain concrete is first placed in a form while the form is being rotated, and an ordinary concrete layer 3 is formed up to almost the outer periphery of the reinforcing cage. Next, expansive concrete is placed to form an expansive concrete layer 4 up to a predetermined wall thickness.

Concrete pipes of the dimensions and constructions tabled below which were obtained by the method of the invention illustrated in FIGS. 1 and 2, were subjected to various tests as will be described below.

| Test Pipes | | A | B |
|---|---|---|---|
| Dimensions (mm) | Inside diameter | 1,000 | 1,300 |
| | Wall thickness | 82 | 112 |
| | Length | 1,200 | 1,200 |
| Specifications of reinforcing cage | | | |
| Covering of circumferentially | | | |

-continued

| Test Pipes | | A | B |
|---|---|---|---|
| wrapped reinforcement (mm) | | 20 | 25 |
| Wire dia. × pitch of circumferentially wrapped reinforcement (mm) | | 3.5 × 31 | 5 × 32 |
| Wire dia. No. of longitudinal reinforcing members | | 4.0 × 12 | 5 × 24 |
| Concrete mix | | | |
| Unit amount of cement (kg/m³) | | 500 | 500 |
| Sand rate | (%) | 40 | 40 |
| Water – cement ratio | (%) | 36 | 36 |
| Maximum aggregate size | (mm) | 25 | 25 |

Note: Of the pipes made in conformity with the above specifications, the pipe using a commercially available expansive cement will be hereinafter called "CP pipe" and the pipe using ordinary cement, "ordinary pipe".

Test Example I (Test for measuring strains produced in constraining reinforcement by the force of expansion of concrete during the course of curing)

Figure 5:
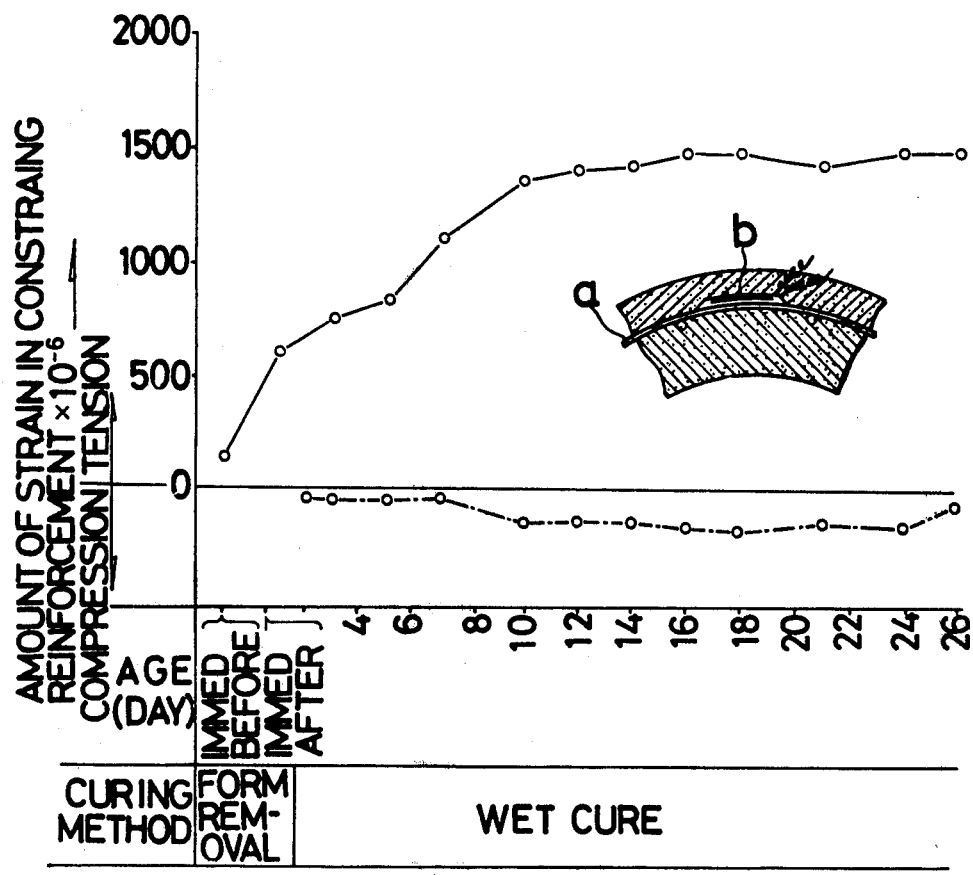
FIG. 5 is a graph illustrating the procedure of Test Example 1 and the results.

This test was carried out by attaching a strain gauge $b$ to a constraining reinforcement $a$ arranged in a test specimen A as shown in FIG. 5. The results are given in FIG. 5, wherein the solid line represents the measurement curve of the CP pipe, and the alternate long and short dash line represents that of the ordinary pipe (the same applying to all of the entailing graphs).

The test indicated that the CP pipe was imparted with a tensile strain immediately after the removal of the form and, on the 7th day after the form removal, it attained more than 80 percent of the maximum strain which it obtained at the age of 26 days. By contrast, the ordinary pipe displayed compressive strain throughout the test period.

Test Example II (Test for measuring the amount of deflection which caused an initial crack on the inner wall surface of the pipe at the age of 28 days, under an external-pressure test load)

Figure 6:
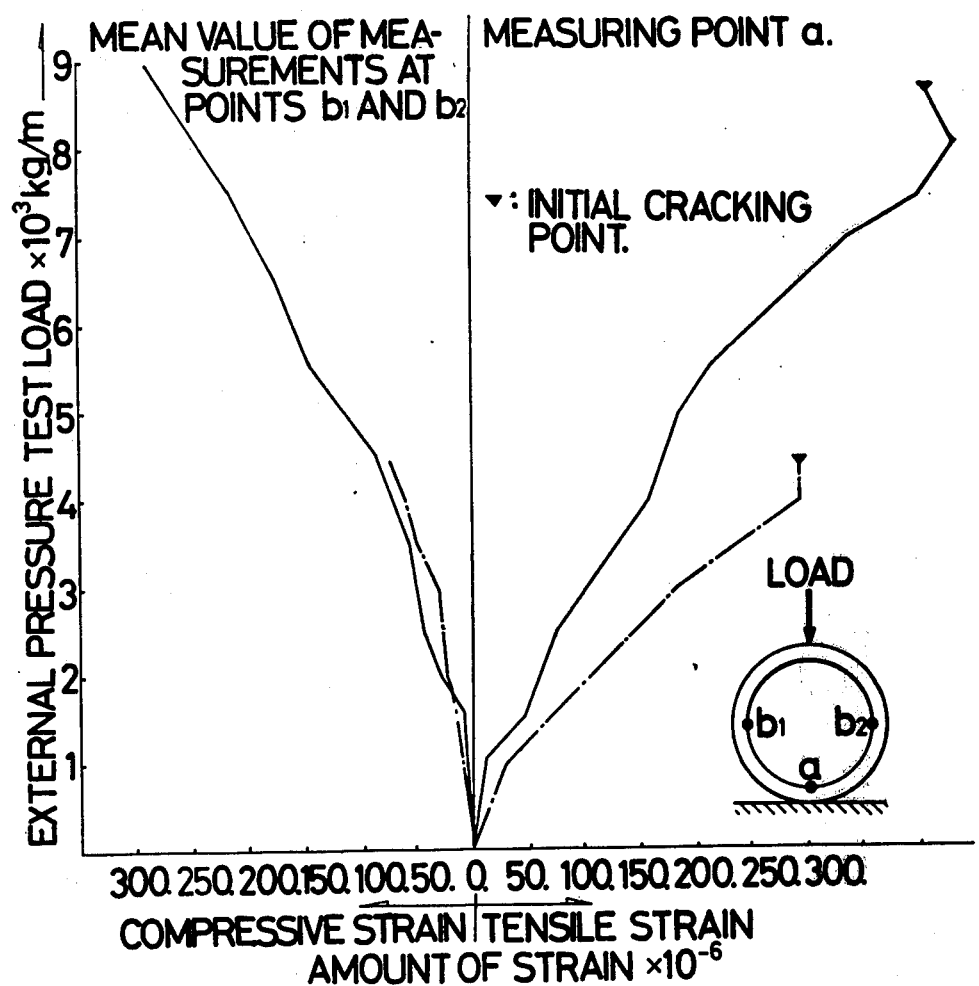
FIG. 6 is a graph illustrating the procedure of Test Example II and the results.

This test was conducted with the test specimen B. As shown in FIG. 6, strain gauges were attached to a lower point $a$ and both side points $b_1$ and $b_2$ on the inner wall surface of the middle portion of the pipe, and changes of strain with an external-pressure test load were determined.

The test results show that the amount of strain that led to initial cracking of the CP pipe at the point $a$ was by far the greater than that for the ordinary pipe. This means that the concrete had been imparted with prestress because of the restraint of the expansion of the concrete by the reinforcement.

The CP pipe and ordinary pipe gave little difference in the compressive strains at the points $b_1$ and $b_2$.

Test Example III (Test for measuring the amount of deflection which occurred in the vertical direction of the pipe at the age of 28 days, under an external-pressure test load)

Figure 8:
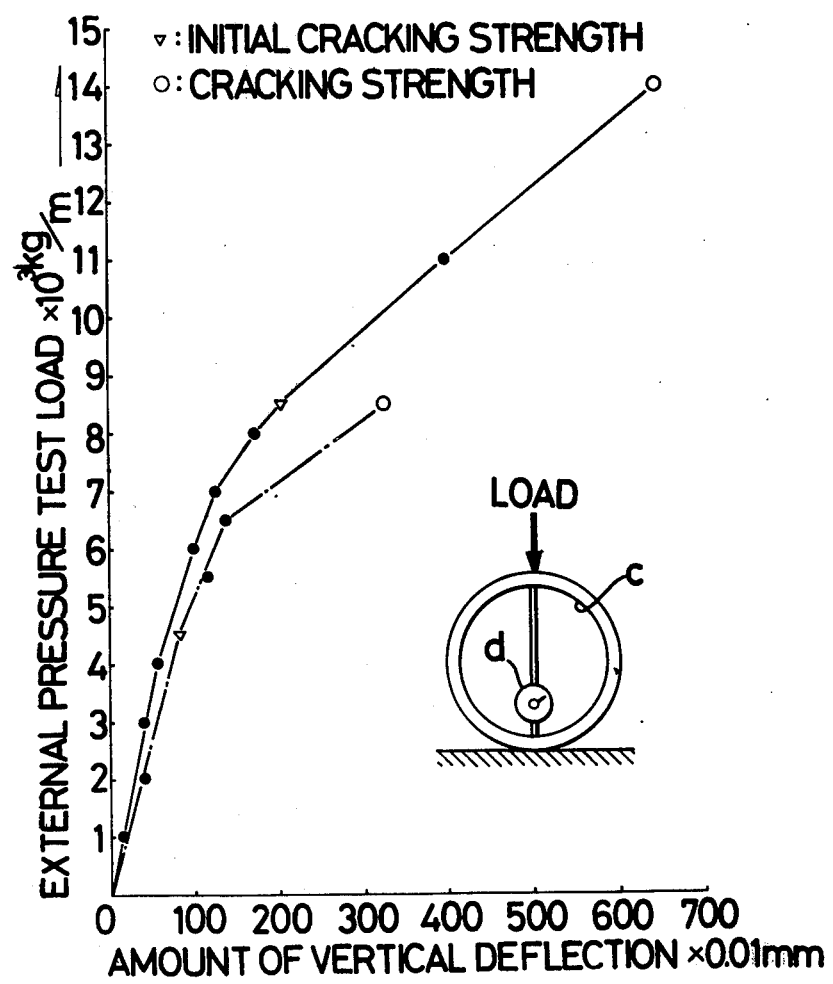

This test was conducted with the both specimens A and B. As shown in FIGS. 7 and 8, a dial gauge $d$ graduated in 0.01 mm was installed inside each test pipe $c$, and the measurement was made with this gauge $d$. FIGS. 7 and 8 give the measured values of the specimens A and B, respectively.

It will be clear from the graphs that the amount of deflection that led to initial cracking of the CP pipe was much greater than that for the ordinary pipe.

Typical of the test results thus obtained may be tabulated as follows.

| | Specimen A | | Specimen B | |
|---|---|---|---|---|
| | CP pipe | Ord. pipe | CP pipe | Ord. pipe |
| Initial cracking strength (kg/m) | 7,500 | 3,300 | 8,850 | 4,500 |
| Cracking strength* (kg/m) | 7,800 | 4,000 | 12,000 | 8,500 |
| Breaking strength (kg/m) | 9,290 | 6,000 | 16,850 (unbroken) | 16,330 |

*Cracking strength means the material strength at the point where a crack has developed to a width of 0.25 mm.

According to this invention, compacting of concrete is accomplished centrifugally, and naturally much expanding agent is collected in the inner one of the pipe wall layers. As a result, the amount of expansion in the inner layer is greater than in the outer layer. The amount of the expanding agent used being the same, the amount of imparted prestress in the resulting pipe is greater than that in a pipe formed by conventional method, for example vibration compacting technique, other than the centrifugal process.

Test Example IV (Test for analysis of the concrete material constituting the individual pipe wall layers after the forming)

Test concrete pipes of dimensions tabled below were formed by centrifugal and vibratory compaction (both in the known manner), and the distribution of the expanding agent in the concrete layers outside and inside of the reinforcement was investigated. The results were as tabulated below.

| Pipe size (mm) | | | Test component* | Standard concrete mix | Result of analysis (3-point mean)** | | | |
|---|---|---|---|---|---|---|---|---|
| I.D. | Wall Thickness | Length | | | Centrifugal | | Vibratory Compactn. | |
| | | | | | $a_1a_2a_3$ | $b_1b_2b_3$ | $a_1a_2a_3$ | $b_1b_2b_3$ |
| 1,000 | 82 | 2,450 | C+E kg/m³ | 450 | 337 | 562 | 453 | 448 |
| " | " | " | A/C+E | 3.83 | 5.38 | 2.65 | 1707 | 1745 |
| " | " | " | E kg/m³ | 54 | 35.4 | 75.3 | 53.5 | 54.2 |

*C = Cement; E = Expanding agent; A = Aggregate (sand + gravel)
a = Concrete layer outside of the constraining reinforcement
b = Concrete layer inside of the constraining reinforcement
**The specimens were obtained in amounts of about 5 kg each from the portions $a_1$, $a_2$, $a_3$, $b_1$, $b_2$, and $b_3$, hatched in FIG. 9, of the middle of each test pipe.

As can be seen from the above table, the expanding agent is distributed in a larger proportion in the concrete layer inside of the constraining reinforcement formed centrifugally than in the corresponding layer by the vibratory compacting technique.

Test Example V (Test for clarifying the relationship between the unit amount of expansive cement in concrete and the amount of imparted prestress)

The test was conducted with a square column, measuring 10 by 10 by 45 cm, as shown in FIGS. 10(I) through (IV). Covering of the longitudinal constraining reinforcement p was 2 cm, and the ratio of reinforcement was 0.95%. Crosswise, the column was constrained at two points with iron bands q, 1 cm wide and 0.3 cm thick. Longitudinally it was constrained with iron end plates r.

For each specimen the expansive cement contained 12 percent of expanding agent on the basis of the cement weight.

Using these specimens, the variations of imparted prestress with the unit amount of expansive cement used were examined. The results are plotted in FIG. 11. It will be seen from the graph that the increase of the unit amount of expansive cement is substantially proportional to the amount of prestress induced in the resulting concrete.

Test Example VI (Comparison of external-pressure test strength of CP pipe formed centrifugally with that of CP pipe made by vibratory compaction)

Test pipes of the following size and structure were employed:

| Size of test pipe | | | Constraining reinf. cage* | | | | Expans. conc. mix** Unit amt. of exp. cem. (kg/m³) | Sand rate (%) | W/C ratio (%) | Method of forming test pipe |
|---|---|---|---|---|---|---|---|---|---|---|
| I.D. (mm) | wall thickness (mm) | Length (mm) | circum. Reinf. ratio (%) | reinf. Dia.× pitch | longi. Reinf. ratio (%) | reinf Dia.× No. | | | | |
| 1,000 | 82 | 2,430 | 0.42 | 4×36.5 | 0.11 | 4×24 | 450 | 42 | 43 | Centrifugal |
| " | " | " | " | " | " | " | " | " | " | Vibratory compaction |

*The constraining reinforcing cage was formed of special steel wires by an automatic welding machine.
**Maximum size of the aggregate in the expansive concrete was 24 mm.

The external-pressure test strength values of these test pipes were determined, and results as shown in FIG. 12 were obtained. In the graph, the solid-line curves indicate the strength properties of the pipe formed centrifugally, and the broken-line curves indicate those of the pipe formed by vibratory compacting technique.

As can be seen from the results of Test Examples IV, V, and VI, the pipe according to this invention is formed centrifugally and exhibits greater pressure test strength than the pipes made in other ways.

In the foregoing method of the invention, it is possible to incorporate a novel arrangement of reinforcement as will be described below thereby to manufacture concrete pipe of high strength economically through effective introduction of prestress. The arrangement of reinforcement is such that the ratio of effective reinforcement ratios, that is, $$\frac{\text{Effective longitudinal reinforcement ratio}}{\text{Effective circumferential reinforcement ratio}}$$

is chosen from the range of 0.1 to 0.25, and then the concrete pipe is effectively held in prestress.

Figure 13:
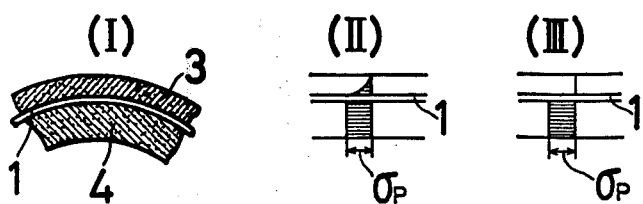

For the purpose of this invention, the reinforcement 1 shown in FIGS. 1 and 2 is herein called the circumferentially wrapped reinforcement, and the reinforcement 2 is called the longitudinal reinforcing members. In FIG. 13 (I), the concrete layer 3 outside of the circumferentially wrapped reinforcement 1 is allowed to expand freely, whereas the concrete layer 4 inside is restrained by the same reinforcement and is thereby held in tension. Actually a concrete pipe containing an expansive component is wet cured as cast in the form, and therefore the stress in the concrete mass is presumably distributed as illustrated in FIG. 13 (II), wherein $\sigma_p$ indicates the magnitude of the prestress introduced into the concrete. On the other hand, the distribution of the stress in the outer concrete layer 3 is not clear and, when that layer is subjected to an external-pressure load, the stress distributed in that layer is not effective. For this reason the stress distribution in the outer layer is disregarded and it is assumed that prestress is distributed as shown in FIG. 13 (III). In the present invention, therefore, the calculation of the effective ratios of the circumferential and longitudinal reinforcements is based on the dimensions of the cross section of concrete inwardly of the center axis of the circumferentially wrapped reinforcement. The effective longitudinal reinforcement ratio is in the range of 0.16 to 0.25% and the effective circumferentially extending reinforcement ratio is in the range of 1.0 to 1.6%.

It has now been found that, when the ratio of the effective longitudinal reinforcement ratio to the effective circumferential reinforcement ratio calculated in the manner above described is called the "ratio of effective reinforcement ratios" and when an arrangement of reinforcement wherein the ratio, that is, $$\frac{\text{Effective longitudinal reinforcement ratio}}{\text{Effective circumferential reinforcement ratio}} = \text{ratio of effective reinforcement ratios}$$

is within the range from 0.1 to 0.25, prestress is most effecttively introduced into the concrete and a concrete pipe of great strength is obtained.

Figure 16:
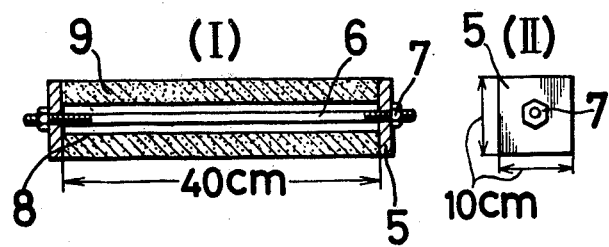

The expanding agent to be used in the expansive concrete for the practice of the present invention is, for example, a ternary agent consisting of 55–67% CaO, 4–10% $Al_2O_3$, and 29–40% $SO_3$, all by weight. When this expanding agent is mixed in cement, in an amount of 7–11% on the basis of the weight of the cement, the resulting mixture, for example of the formulation as tabled below, gives an expansion amount of $6-15\times10^{-4}$ with a specimen, for example as shown in FIG. 16, which is uniaxially constrained with a reinforcement ratio of 1.0 to 1.5%. (In the figure, numeral 5 designates a fixing plate; 6, a longitudinal reinforcement; 7, a nut; 8, a polyvinyl chloride sheath; and 9, concrete.) Concrete mixture of such a formulation is suitable for the arrangement of reinforcement according to this invention.

| Mix.size (mm) | Slump (cm) | W/C* (%) | S/a (%) | Unit amount (kg/cm³) | | | |
|---|---|---|---|---|---|---|---|
| | | | | W | C* | S | C |
| 10 | 10 | 50 | 38 | 185 | 370 | 697 | 1145 |

*C = expansive cement (normal portland cement + expanding agent); W = water; S = fine aggregate; a = total aggregate; G = coarse aggregate.

The ratio of effective reinforcement ratios is limited to the range of 0.1 to 0.25 as above mentioned for the following reasons. If the ratio is less than 0.1, prestress is imparted circumferentially but, because of a decrease in the longitudinal reinforcement ratio, the product tends to crack easily in the circumferential direction and hence has no commercial importance. Conversely if the ratio is more than 0.25, prestress is not effectively imparted to the concrete (as will be evident from the test results to be given later).

The expanding agent is mixed in concrete preferably in an amount of 7 to 11% on the basis of the weight of the cement, because if the amount is less than 7% the prestress to be introduced is too low for the practical purpose, and if the amount is more than 11% the magnitude of expansion thereby caused will be so large that the product will again lose its commercial value because it is easily cracked.

Next, tests were conducted with pipes formed with the use of the above-mentioned expanding agent and with the arrangement of reinforcement according to this invention.

Test Example VII

Figure 14:
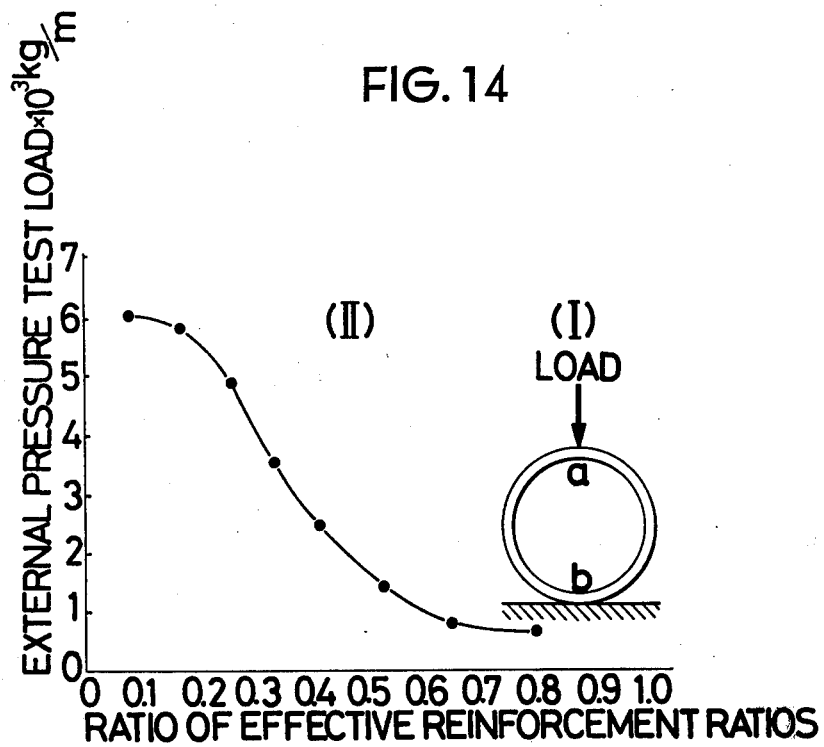

Using a concrete in which the expanding agent was added to normal Portland cement in an amount of 10% on the basis of the cement weight, a concrete pipe 60 cm in inside diameter, 5 cm in wall thickness, and 243 cm in length was made. A weight W was placed on the pipe as shown in FIG. 14(I) and the external-pressure load which caused initial cracks at the points $a$ and $b$ were measured. The results were as plotted in the graph of FIG. 14(II) (initial cracking curve).

Since the external-pressure load under which the initial crack occurs is proportional to the prestress imparted to the concrete, it will be seen from the curve that the prestress is imparted most effectively when the ratio of effective reinforcement ratios is between 0.1 and 0.25.

Test Example VIII

The expanding agent was added in different amounts of 7, 10, and 14% to normal Portland cement on the basis of the cement weight. Using the resulting concrete formulations, concrete pipes each measuring 20 cm in outside diameter, 4 cm in wall thickness and 30 cm in length were formed and tested in the same manner as described in Test Example I with test loads for initial cracking. Then, wire strain gauges were attached to the points $a$ and $b$ of FIG. 14(I), and the loads were again placed on the specimens. The stress at the point where re-cracking took place was regarded as the prestress, and, in this way, the graph of FIG. 15 (curves of imparted prestresses calculated from the strains of the reinforcements) was obtained. The curves of FIG. 15 represent the values of the test specimens which had the expanding agent contents of 7, 10, and 14%.

From these results it is obvious that the prestress is most effectively imparted to the concrete in which the ratio of effective reinforcement ratios is between 0.1 and 0.25%, regardless of the dimensions of the concrete pipe and of the proportion of the expanding agent contained.

As stated hereinbefore, the concrete pipe obtained in accordance with the present invention has remarkably greater strength against external pressure than those of the ordinarily reinforced and centrifugally formed concrete pipe and the prestressed concrete pipe which contains an expanding agent and formed by the vibratory compaction technique. An additional advantage of this invention is that prestressed concrete pipe is manufactured without the need of special equipment or extra labor.

What is claimed is:

1. A method of manufacturing prestressed concrete pipe in a form comprising the steps of forming a reinforcing cage of laterally spaced longitudinally extending reinforcing members arranged in a circle and wrapping circumferentially extending reinforcement about the exterior surface of the longitudinally extending reinforcing members so that the outside diameter of the reinforcing cage is smaller than the inside diameter of the outer form wall with as little gap as possible between the outside surface of the cage and the inside wall surface of the outer form wall, arranging the longitudinally extending reinforcing members and the circumferentially extending reinforcement so that the effective reinforcement ratio for longitudinally extending reinforcing members is in the range of 0.16 to 0.25% and the circumferentially extending reinforcement is in the range of 1.0 to 1.6%, based on the cross-sectional area of the respective components divided by the cross-sectional area of the concrete inwardly of the center axis of the circumferentially wrapped reinforcement and arranging the ratio of effective reinforcement ratios consisting of the effective reinforcement ratio of the longitudinally extending reinforcement members divided by the effective reinforcement ratio of the circumferentially extending reinforcement in the range of 0.1 to 0.25 so that cracking in the circumferential direction is avoided by maintaining the ratio at more than 0.1 and effective prestressing is attained by maintaining the ratio at less than 0.25, placing the reinforcing cage in the form, casting ordinary concrete within the form and rotating the form for forming a layer of ordinary concrete between the outer periphery of the reinforcing cage and the inner wall surface of the outer form wall, and then casting expensive concrete in the form for filling the form inwardly of the layer of ordinary concrete and encasing the reinforcing cage, and centrifugally forming the pipe.

2. A method of manufacturing prestressed concrete pipe in a form comprising the steps of forming a reinforcing cage of laterally spaced longitudinally extending reinforcing members arranged in a circle and wrapping circumferentially extending reinforcement about the exterior surface of the longitudinally extending reinforcing members so that the outside diameter of the reinforcing cage formed is smaller than the inside diameter of the outer form wall with as little gap as possible between the outside surface of the reinforcing cage and the inner wall surface of the outer form wall, arranging the longitudinally extending reinforcing member and the circumferentially extending reinforcement so that the effective reinforcement ratios for the longitudinally extending reinforcing members is in the range of 0.16 to 0.25% and in the circumferentially extending reinforcement is in the range of 1.0 to 1.6%, based on the cross-sectional area of the respective reinforcement component divided by the cross-sectional area of the concrete inwardly of the center axis of the circumferentially wrapped reinforcement and arranging the ratio of effective reinforcement ratios consisting of the effective reinforcement ratio of the longitudinally extending reinforcing members divided by the effective reinforcement ratio of the circumferentially extending reinforcement in the range of 0.1 to 0.25 so that cracking in the circumferential direction is avoided by maintaining the ratio at more than 0.1 and effective prestressing is attained by maintaining the ratio at less than 0.25, placing the reinforcing cage in the form, casting expansive concrete within the form with the reinforcing cage disposed outwardly of the center of the wall thickness of the concrete layer and centrifugally forming the pipe.

* * * * *